(12) United States Patent
Srivastav et al.

(10) Patent No.: US 8,838,294 B2
(45) Date of Patent: Sep. 16, 2014

(54) METHODS AND SYSTEMS FOR BRIEFING AIRCRAFT PROCEDURES

(75) Inventors: Amit Srivastav, Bangalore (IN); Roger W. Burgin, Scottsdale, AZ (US); Dave Pepitone, Sun City West, AZ (US)

(73) Assignee: Honeywell International Inc., Morristown, NJ (US)

( * ) Notice: Subject to any disclaimer, the term of this patent is extended or adjusted under 35 U.S.C. 154(b) by 164 days.

(21) Appl. No.: 13/154,176

(22) Filed: Jun. 6, 2011

(65) Prior Publication Data

US 2012/0310450 A1    Dec. 6, 2012

(51) Int. Cl.
| G01C 23/00 | (2006.01) |
| G05D 1/00 | (2006.01) |
| G05D 3/00 | (2006.01) |
| G08G 5/00 | (2006.01) |

(52) U.S. Cl.
CPC .................................. *G08G 5/0021* (2013.01)
USPC ................. 701/3; 434/30; 340/945

(58) Field of Classification Search
USPC .............. 701/14, 16, 3, 4, 8, 9, 11, 411, 457; 340/945, 974, 980, 961, 905, 457.1; 342/36, 29; 434/29, 30; 704/275; 715/771
See application file for complete search history.

(56) References Cited

U.S. PATENT DOCUMENTS

| 5,001,476 | A | 3/1991 | Vermilion et al. |
| 5,689,419 | A | 11/1997 | Massat |
| 5,844,503 | A | 12/1998 | Riley et al. |
| 6,002,347 | A | 12/1999 | Daly et al. |
| 6,175,314 | B1 | 1/2001 | Cobley |
| 6,707,475 | B1 * | 3/2004 | Snyder ........................... 715/771 |
| 6,901,330 | B1 | 5/2005 | Krull et al. |
| 7,580,377 | B2 | 8/2009 | Judd |
| 7,693,621 | B1 * | 4/2010 | Chamas .......................... 701/16 |
| 2003/0006910 | A1 | 1/2003 | Dame |
| 2007/0260364 | A1 * | 11/2007 | Dwyer .............................. 701/3 |
| 2009/0325131 | A1 * | 12/2009 | Cernasov et al. ............... 434/30 |
| 2010/0004800 | A1 | 1/2010 | Zammit-Mangion et al. |
| 2010/0030401 | A1 | 2/2010 | Rogers et al. |
| 2010/0148990 | A1 | 6/2010 | Burgin et al. |
| 2010/0161160 | A1 | 6/2010 | Wilson et al. |

FOREIGN PATENT DOCUMENTS

| EP | 1852683 A2 | 11/2007 |
| EP | 2199747 A2 | 6/2010 |
| WO | 2008024130 A2 | 2/2008 |

OTHER PUBLICATIONS

European Patent Office, European Office Action for Application No. 12 168 765.1 dated Sep. 5, 2012.
EP Search Report for 12 168 765.1 dated Aug. 24, 2012.
EP Communication, EP 12168765.1-1810 dated Jun. 3, 2013.

* cited by examiner

*Primary Examiner* — Tuan C. To
*Assistant Examiner* — Isaac Smith
(74) *Attorney, Agent, or Firm* — Ingrassia Fisher & Lorenz, P.C.

(57) ABSTRACT

Methods and systems are provided for providing procedure information associated with an aircraft procedure onboard an aircraft. An exemplary method involves obtaining a briefing sequence for the aircraft procedure and providing the procedure information via the output device, wherein the procedure information is provided in accordance with the briefing sequence. When the output device is realized as an audio output device, the procedure information is sequentially provided auditorily via the audio output device. In one or more embodiments, the procedure information is sequentially indicated on a display device onboard the aircraft in concert with the auditorily provided procedure information.

18 Claims, 10 Drawing Sheets

METHODS AND SYSTEMS FOR BRIEFING AIRCRAFT PROCEDURES

TECHNICAL FIELD

The subject matter described herein relates generally to avionics systems, and more particularly, embodiments of the subject matter relate to briefing aircraft procedures onboard an aircraft.

BACKGROUND

Published aeronautical charts, such as, for example, Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like, depict and describe the procedures for operating aircraft at or in the vicinity of various airports, runways, or other landing and/or departure locations. These charts graphically illustrate and describe the specific procedure information and instructions (e.g., minimum descent altitudes, minimum runway visual range, final course or heading, relevant radio frequencies, missed approach procedures) to be followed or otherwise utilized by a pilot for executing a particular aircraft procedure. These charts are typically provided by a governmental or regulatory organization, such as, for example, the Federal Aviation Administration in the United States. Traditionally, a pilot would maintain copies of these printed charts for the various possible airports that the pilot may encounter during operation of the aircraft.

Electronic displays in many modern flight deck displays (or cockpit displays) are eliminating the need to maintain paper charts for the various procedures that a pilot may need to execute. However, the size of the electronic display inside an aircraft cockpit is often limited due to the number of instruments and human-machine interface elements inside the cockpit (e.g., joysticks, knobs, buttons, and the like) along with the need for the pilot to have an unobstructed view outside the aircraft. Furthermore, some of the display area on the electronic display may be utilized or reserved for other processes (e.g., primary flight displays, synthetic vision displays, vertical situation displays, flight management windows, and the like). As a result, it is difficult to display all of the procedure information for operating the aircraft on an electronic display in a clear and uncluttered manner. Thus, in many situations, the procedure information is not shown on the display in its entirety.

Standard operating procedures (SOPs) or crew resource management (CRM) protocols often require that a pilot review (or brief) an aircraft procedure before attempting to execute that procedure. For example, the SOP or CRM protocol may dictate that the pilot review the approach procedure prior to or just after the top of descent point, or in any event, prior to reaching the terminal area and beginning the approach. In some situations, the pilot may also be required to review a subset of the procedure information for the approach procedure prior to final approach (e.g., prior reaching the final approach fix and/or prior to the minimum descent altitude). In existing systems, the pilot is required to review the procedure off the paper chart or the electronic display, which distracts the pilot from any other visual tasks that the pilot may need to perform (e.g., a concurrent visual monitoring requirement) and requires that the pilot locate the appropriate procedure information on the paper chart and/or electronic display. Additionally, when the electronic display does not include all of the necessary procedure information to be briefed, the pilot may need to manipulate the electronic display to review the necessary procedure information. Accordingly, it is desirable to reduce the workload on the pilot and improve situational awareness.

BRIEF SUMMARY

A method is provided for providing procedure information associated with an aircraft procedure. The method involves obtaining a briefing sequence for the aircraft procedure, and providing the procedure information via an output device onboard the aircraft, wherein the procedure information is provided in accordance with the briefing sequence. In one or more embodiments, the procedure information associated with the aircraft procedure is sequentially provided via an audio output device onboard an aircraft in accordance with the briefing sequence.

In another embodiment, a system suitable for use with an aircraft is provided. The system includes an audio output device onboard the aircraft, a data storage element configured to maintain a briefing sequence for an aircraft procedure, and a processing system coupled to the audio output device and the data storage element. The briefing sequence represents an ordering of criteria for a plurality of categories of procedure information associated with the aircraft procedure. The processing system is configured to obtain the briefing sequence from the data storage element and sequentially provide signals indicative of the criteria to the audio output device in accordance with the ordering, wherein the signals result in auditory output provided by the audio output device that is indicative of the criteria in the ordering prescribed by the briefing sequence.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Embodiments of the subject matter described herein relate to systems and methods for automatically briefing a pilot, co-pilot, or another aircraft operator on an aircraft procedure during operation of the aircraft. As described in greater detail below, in an exemplary embodiment, the aircraft procedure (e.g., an approach, an arrival, a departure, or the like) to be briefed and/or executed has a predefined briefing sequence associated therewith, wherein the briefing sequence prescribes criteria for various categories of procedure information associated with the aircraft procedure along with an order in which those criteria should be briefed by the aircraft operator. In exemplary embodiments, the briefing sequence includes ordered safety and operational information relevant to the aircraft procedure to be flown. For example, a briefing sequence for an instrument approach procedure may include the name of the airport associated with the instrument approach procedure and the name of the instrument approach procedure, followed by the appropriate navigation radio frequencies for the instrument approach procedure, the final approach course, initial approach altitude to the final approach fix (FAF), the appropriate minima for the instrument approach procedure, and the missed approach procedure information for the instrument approach procedure. As described in greater detail below, in response to determining that an aircraft procedure should be briefed, the criteria specified by the briefing sequence are automatically provided to the aircraft operator auditorily and/or visually in the sequential manner defined by the briefing sequence without any manual interaction by the pilot. As a result, the pilot is briefed with the requisite procedure information for the aircraft procedure in a clear and convenient manner without increasing the burden on the pilot or distracting the pilot from other tasks the pilot may be executing concurrently.

Figure 1:
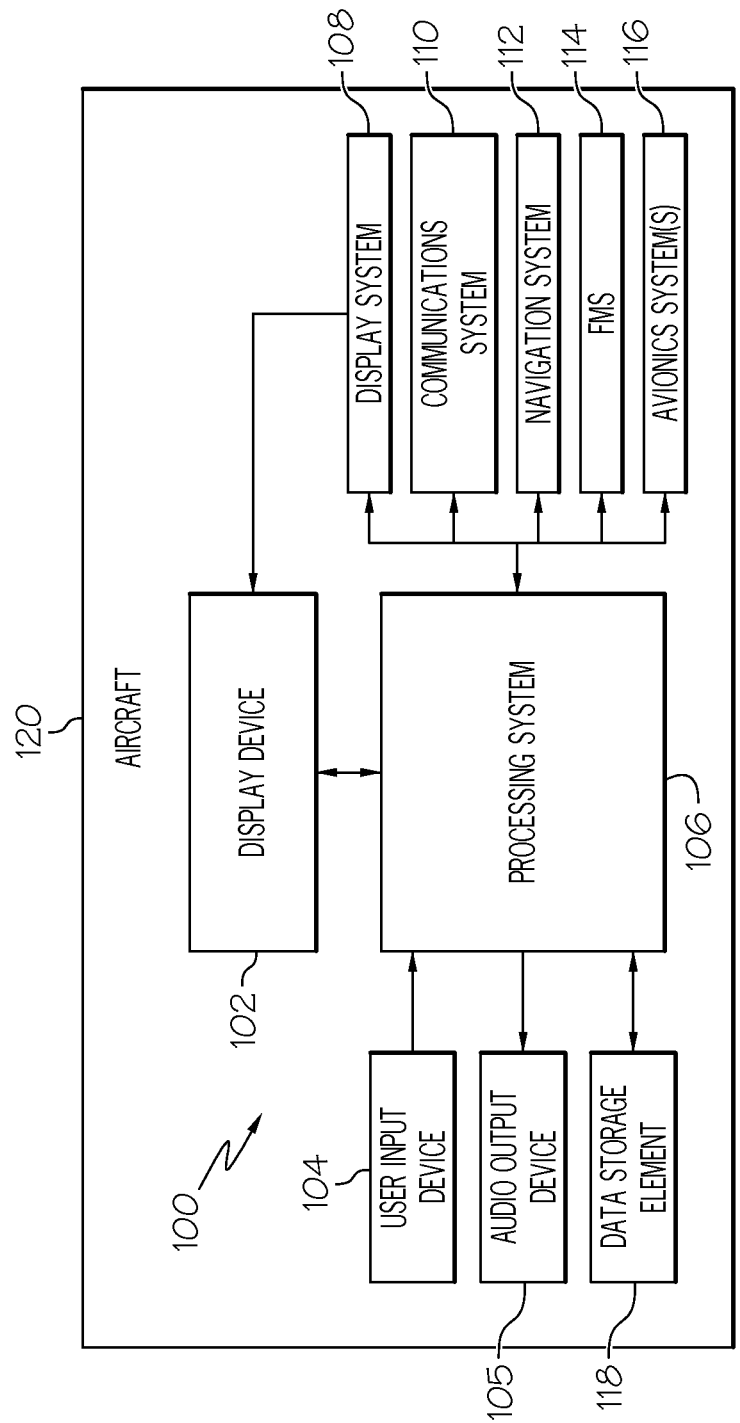
FIG. 1 is a block diagram of a system suitable for use with an aircraft in an exemplary embodiment.

FIG. 1 depicts an exemplary embodiment of a system 100 which may be utilized with a vehicle, such as an aircraft 120. In an exemplary embodiment, the system 100 includes, without limitation, a display device 102, a user input device 104, an audio output device 105, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, wherein the processing system 106 and the display system 108 are cooperatively configured to display, render, or otherwise convey one or more graphical representations or images associated with operation of the aircraft 120 on the display device 102, as described in greater detail below. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the system 100 in a "hands free" manner without requiring the user to move his or her hands, eyes and/or head to interact with the system 100. The audio output device 105 is coupled to the processing system 106, and the audio output device 105 and the processing system 106 are cooperatively configured to provide auditory feedback to a user, as described in greater detail below. Depending on the embodiment, the audio output device 105 may be realized as a speaker, headphone, earphone, earbud, or another suitable device adapted to provide auditory output to a user. In this regard, in some embodiments, a user input device 104 and an audio output device 105 may be integrated on a single headset, as will be appreciated in the art.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. In some embodiments, when the user input device 104 is realized as an audio input device, the processing system 106 may implement a speech recognition engine (or voice recognition engine) and/or speech-to-text system adapted to receive audio input from a user. The processing system 106 may also include various filters, analog-to-digital converters (ADCs), digital-to-analog converters (DACs), speech synthesizers, and the like, which are suitably configured to support operations of the system 100 (e.g., receiving auditory input from the user input device 104 or providing auditory feedback via the audio output device 105).

The display system 108 generally represents the hardware, software, and/or firmware components configured to control the display and/or rendering of one or more navigational maps and/or other displays pertaining to operation of the aircraft 120 and/or systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

As described in greater detail below, in an exemplary embodiment, the processing system 106 includes or otherwise accesses data storage element 118, which contains aircraft procedure information for a plurality of airports and maintains the association between the aircraft procedure information and their corresponding airports. As used herein, aircraft procedure information should be understood as a set of operating parameters or instructions associated with a particular aircraft action (e.g., approach, departure, arrival, climbing, and the like) that may be undertaken by the aircraft 120 at or in the vicinity of a particular airport. In an exemplary embodiment, the procedure information for a particular aircraft action (or aircraft procedure) includes various possible criteria for various categories or types of procedure information (e.g., the name or identification of the procedure, possible radio frequencies for the procedure, possible minima for the procedure, auxiliary instructions or notes on the procedure, and the like) along with graphic elements (e.g., symbols for navigational reference points, navigational segments, procedure turns, and the like) that graphically illustrate that aircraft action and textual information associated with the graphic elements that further describe the operating parameters or instructions for executing that aircraft action. For example, the procedure information for an instrument approach procedure for an airport may include categories for the name or identification of the approach, the possible radio frequencies for the approach, the possible minima for the approach, instructions or notes on the missed approach procedure, and the like, along with symbols and navigational segments that graphically illustrate the approach course (including procedure turns for transitioning to/from the approach course and the missed approach) and textual information associated with the symbols and/or navigational segments that describe the operating parameters or otherwise provide instructions for operating the aircraft at or in the vicinity of those symbols and/or navigational segments. As described in greater detail below, in an exemplary embodiment, for each aircraft action at an airport, the data storage element 118 also maintains briefing sequence indicative of selected criteria for the various categories of procedure information associated with that aircraft action for subsequently briefing that aircraft action via the audio output device 105 and/or display device 102.

As used herein, an airport should be understood as referring to a location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival (or descent), a departure (or takeoff), an ascent (or climb), taxiing, or another aircraft action associated with an airport and having associated aircraft procedure information. For example, each airport may have one or more predefined aircraft procedures associated therewith (e.g., approach procedures, departure procedures, arrival routes, departure routes, and the like), wherein the aircraft procedure information for each aircraft procedure at each respective airport may be maintained by the data storage element 118. The aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like.

Depending on the embodiment, the data storage element 118 may be physically realized using RAM memory, ROM memory, flash memory, registers, a hard disk, or another suitable data storage medium known in the art or any suitable combination thereof. In an exemplary embodiment, the processing system 106, the display system 108, and/or the FMS 114 are cooperatively configured to render and/or display aircraft procedure information overlying a navigational map on the display device 102, as described in greater detail below. It should be noted that although the subject matter is described below in the context of arrival procedures and/or approach procedures for purposes of explanation, the subject matter is not intended to be limited to use with any particular type of aircraft procedure and may be implemented for other aircraft procedures (e.g., departure procedures) in an equivalent manner.

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In accordance with one or more embodiments, the FMS 114 (or another avionics system 116) is configured to determine, track, or otherwise identify the current flight phase of the aircraft 120. As used herein, a flight phase of the aircraft 120 should be understood as a distinguishable segment of the operation (or distinguishable operating phase) of the aircraft 120 associated with traversing the aircraft 120 from a starting location to an ending location. For example, operation of the aircraft 120 from a starting location (e.g., a terminal at a first airport) to an ending location (e.g., a terminal at a second airport) usually comprises a plurality of flight phases, such as, for example, a standing phase (e.g., when the aircraft is stationary on the ground), a pushback or towing phase (e.g., when the aircraft is moving on the ground with assistance), a taxiing phase, a takeoff phase, a climbing phase (e.g., including the initial climb and/or climb to cruise), a cruising phase, a descent phase (e.g., from cruise altitude to initial approach), an arrival phase, an approach phase, a landing phase, a rollout phase, a missed approach phase, and the like. Various phases of flight are well known, and will not be described in detail herein. It should be noted that the phases of flight may be combined and/or categorized in numerous possible manners and/or each phase of flight may comprise numerous subphases (for example, an approach phase may include subphases for holding, procedure turn, flyover, orbit, and the like), and the subject matter is not intended to be limited to any particular number and/or classification of flight phases.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, the audio output device 105, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). In this regard, in some embodiments, the display device 102, the user input device 104, the audio output device 105, and/or the processing system 106 may be implemented as an electronic flight bag that is separate from the aircraft 120 but capable of being communicatively coupled to the other elements of the system 100 when onboard the aircraft 120. Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the display system 108 or the FMS 114. In other words, some embodiments may integrate the processing system 106 with the display system 108 or the FMS 114, that is, the processing system 106 may be a component of the display system 108 and/or the FMS 114.

Figure 2:
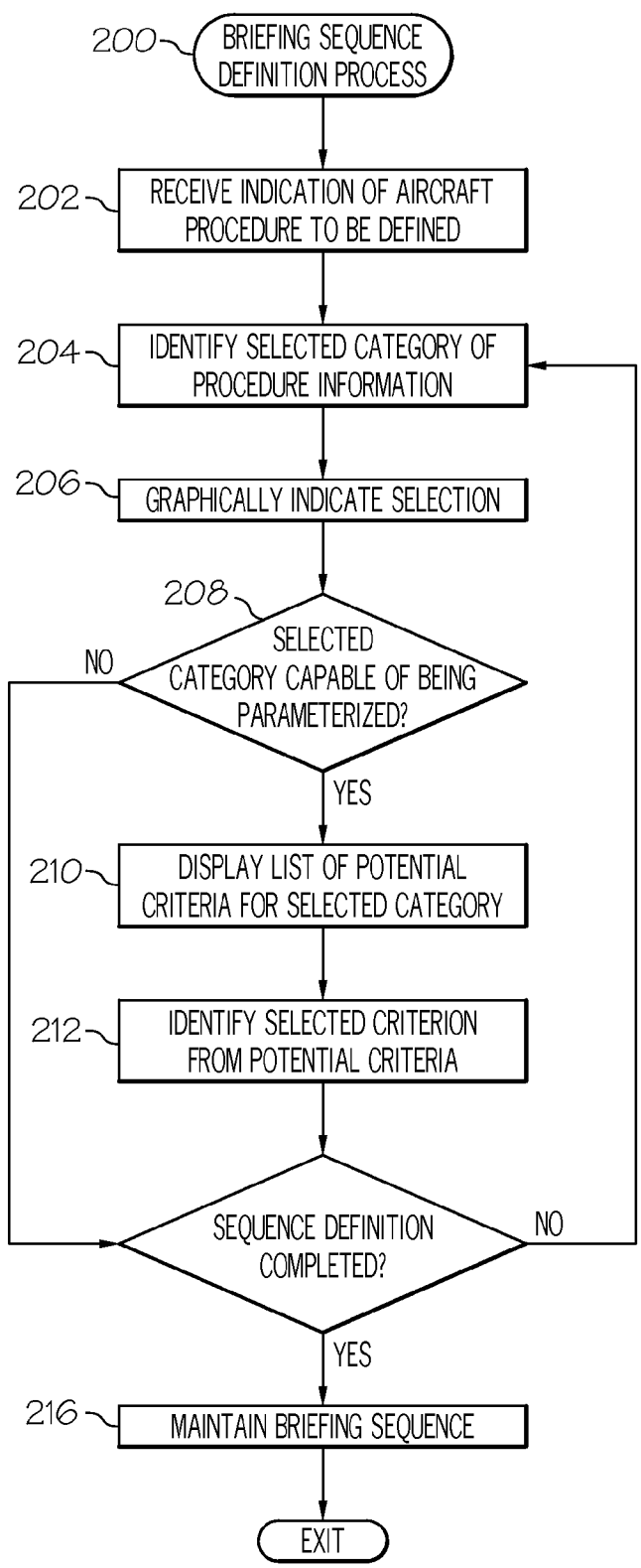
FIG. 2 is a flow diagram of an exemplary briefing sequence definition process suitable for use with the system of FIG. 1 in accordance with one or more embodiments.

Referring now to FIG. 2, in an exemplary embodiment, the system 100 may be configured to perform a briefing sequence definition process 200 and additional tasks, functions, and operations described below. The various tasks may be performed by hardware, firmware, software, or any combination thereof. For illustrative purposes, the following description may refer to elements mentioned above in connection with FIG. 1. In practice, the tasks, functions, and operations may be performed by different elements of the described system, such as the display device 102, the user input device 104, the processing system 106, the display system 108, the communications system 110, the navigation system 112, the FMS 114, the avionics system(s) 116, and/or the data storage element 118. It should be appreciated that any number of additional or alternative tasks may be included, and may be incorporated into a more comprehensive procedure or process having additional functionality not described in detail herein.

In an exemplary embodiment, the briefing sequence definition process 200 is performed by a user (e.g., a pilot, a co-pilot, or another aircraft operator) to define or otherwise designate specific values or criteria for the various categories or types of procedure information associated with a particular aircraft procedure to be used when subsequently briefing and/or executing that aircraft procedure. In this regard, the briefing sequence definition process 200 may be performed while the aircraft 120 is on the ground or otherwise in advance of a time when that aircraft procedure would need to be briefed or reviewed. In some embodiments, the briefing sequence definition process 200 may be performed outside of the aircraft 120 or entirely separate from the aircraft 120 (e.g., using a pilot's electronic flight bag), and subsequently briefed or reviewed by the pilot during operation of the aircraft 120.

In an exemplary embodiment, the briefing sequence definition process 200 begins by receiving indication of the desired aircraft procedure to be defined or otherwise parameterized for subsequent briefing and/or execution (task 202). In this regard, the processing system 106 may display, on the display device 102, a graphical user interface adapted to allow a user to select or otherwise indicate a desire to define parameters for a particular aircraft procedure. For example, referring now to FIG. 3, and with continued reference to FIG. 1 and FIG. 2, the display system 108 and/or processing system 106 may display and/or render, on the display device 102, an aircraft display that includes a navigational map 300. In an exemplary embodiment, the processing system 106 displays and/or renders a graphical user interface element 302, such as a button, overlying the background 304 of the navigational map 300 that is adapted to allow a user to indicate a desire to define and/or brief aircraft procedures. In response to a user manipulating the user input device 104 to select the graphical user interface element 302, the briefing sequence definition process 200 determines or otherwise identifies the appropriate airport for the aircraft procedure to be defined, and in response to identifying the appropriate airport, the briefing sequence definition process 200 displays, on the display device 102, a graphical user interface in a region 310 of the display device 102 proximate the navigational map 300 that is adapted to allow a user to select or otherwise identify the aircraft procedure at the identified airport that the user would like to define parameters for. In some embodiments, the briefing sequence definition process 200 may automatically identify the appropriate airport based on the flight plan maintained by the FMS 114 (e.g., the destination airport for landing the aircraft 120). In other embodiments, the briefing sequence definition process 200 may prompt the user to input or otherwise provide the desired airport. In some embodiments, the briefing sequence definition process 200 may identify the appropriate airport based on a current location of the aircraft 120. For example, in the case of a departure procedure, the briefing sequence definition process 200 may identify the airport closest to the current location of the aircraft 120 (e.g., the airport the aircraft 120 will be departing from) as the appropriate airport.

Figure 3:
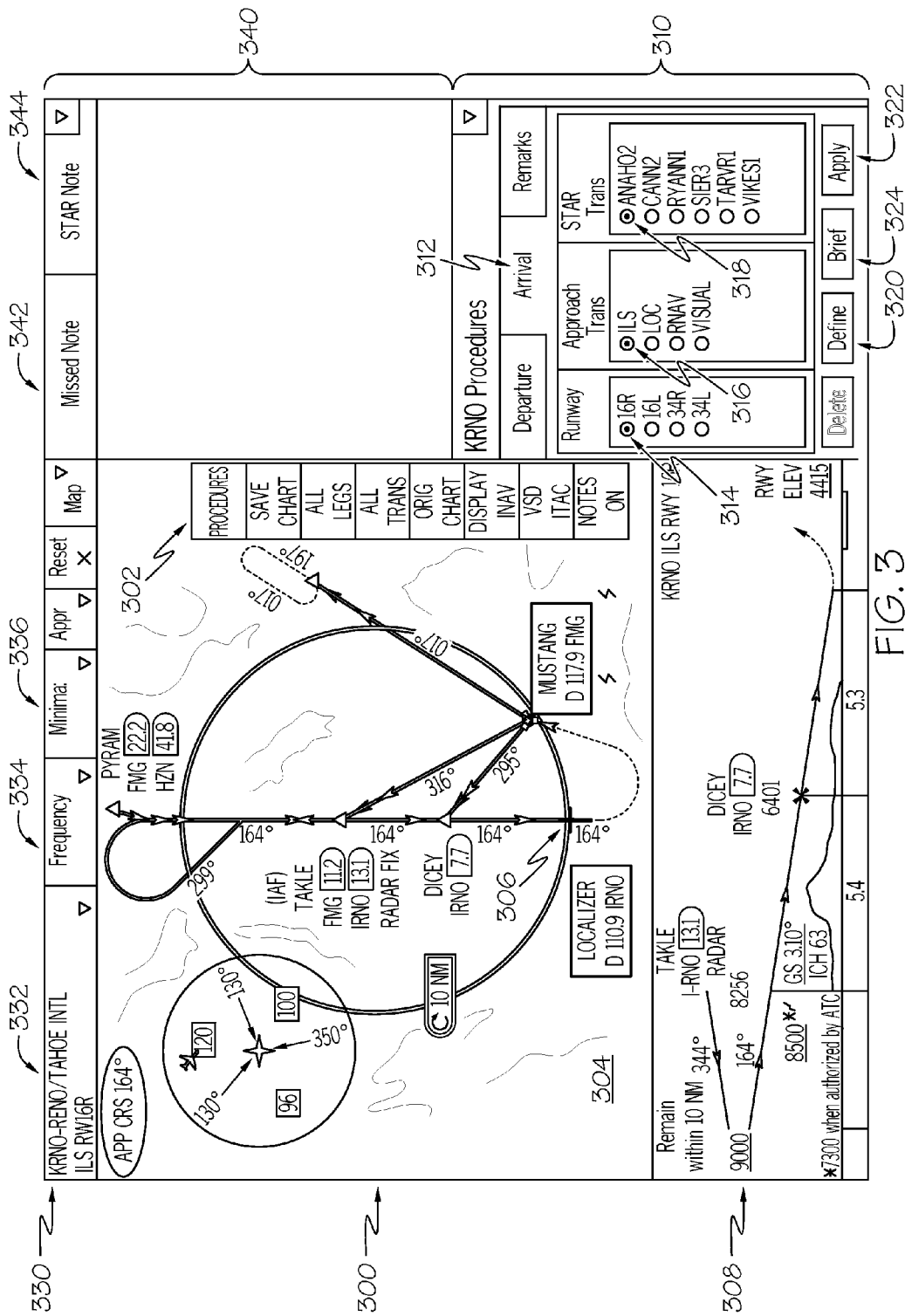
FIGS. 3-8 are schematic views illustrating an exemplary sequence of aircraft displays suitable for use with the briefing sequence definition process of FIG. 2 or the briefing process of FIG. 9 in accordance with one or more exemplary embodiments.

In an exemplary embodiment, after the airport is identified, the briefing sequence definition process 200 automatically updates the geographic area displayed in the navigational map 300 such that the background 304 reflects the terrain in the vicinity of the identified airport. As illustrated in FIG. 3, after updating, the navigational map 300 includes a graphical representation 306 of the identified airport overlying the background 304 in a manner that accurately reflects the real-world positioning of the identified airport with respect to the surrounding terrain. The background 304 of the navigational map 300 is a graphical representation of the terrain, topology, or other suitable items or points of interest, which may be maintained (e.g., by the display system 108) in a terrain database, a navigational database, a geopolitical database, or another suitable database. In various embodiments, the navigational map 300 may include graphical representations of nearby navigational aids (e.g., VORs, VORTACs, DMEs, and the like) and airports overlying the background 304, along with airspace designations and/or airspace restrictions, cities, towns, roads, railroads, and other geo-political information. Although FIG. 3 depicts a top view of the navigational map 300, in practice, alternative embodiments may utilize various perspective views, such as side views, three-dimensional views (e.g., a three-dimensional synthetic vision display), angular or skewed views, and the like.

It should be noted that although not illustrated in FIG. 3, in some embodiments, the navigational map 300 may be associated with the current (or instantaneous) location of the aircraft 120 and include a graphical representation of the aircraft overlying the background 304, wherein during operation of the aircraft 120, the background 304 refreshes or otherwise updates as the aircraft 120 travels, such that the aircraft graphic is positioned over the terrain background 304 in a manner that accurately reflects the current (e.g., instantaneous or substantially real-time) real-world positioning of the aircraft 120 relative to the earth. In some embodiments, the aircraft may be shown as traveling across the navigational map 300 (e.g., by updating the location of the aircraft graphic with respect to the background 304), while in other embodiments, the aircraft graphic may be located at a fixed position on the navigational map 300 (e.g., by updating the background 304 with respect to the aircraft graphic such that the map 300 is maintained centered on and/or aligned with the aircraft graphic). Also, depending on the embodiment, the navigational map 300 may be oriented north-up (i.e., moving upward on the map 300 corresponds to traveling northward) or with respect to another direction, or alternatively, the orientation of the navigational map 300 may be track-up or heading-up (i.e., aligned such that the aircraft graphic is always traveling in an upward direction and the background 304 adjusted accordingly).

Still referring to FIG. 3, and with reference to FIGS. 1-2, after the appropriate airport is identified, a user may manipulate the user input device 104 to select graphical user interface elements displayed by the briefing sequence definition process 200 and/or processing system 106 within the procedure region 310 of the display device 102 to identify or otherwise select the aircraft procedure that the user would like to define. For example, as illustrated, a user may manipulate the user input device 104 to select a tab 312 for arrivals to the identified airport, then select a radio button 314 to identify runway 16R as the desired runway for landing, select radio button 316 to identify the ILS approach to runway 16R as the desired approach procedure to be defined by the briefing sequence definition process 200, and select radio button 318 to identify ANAHO2 as the desired arrival route for transitioning to the ILS approach.

In an exemplary embodiment, after receiving indication of the selected aircraft procedure, the briefing sequence definition process 200 and/or processing system 106 displays or otherwise renders the graphic elements and associated textual information for the selected aircraft procedure that are maintained by data storage element 118 overlying the navigational map. For example, as illustrated in FIG. 3, after selection of buttons 314, 316, 318, the processing system 106 displays the graphic elements and textual information that are associated with the ILS approach for runway 16R overlying the background 304 of the navigational map 300. Additionally, in exemplary embodiments, the briefing sequence definition process 200 and/or processing system 106 updates a vertical profile region 308 on the display device 102 to display the vertical profile for the runway 16R ILS approach and updates a note region 340 to include tabs 342, 344 for selecting notes or other auxiliary instructions associated with the runway 16R ILS approach. In an exemplary embodiment, the briefing sequence definition process 200 and/or processing system 106 also displays and/or renders a briefing panel overlying the navigational map. For example, as illustrated in FIG. 3, the briefing panel 330 may be rendered and/or displayed overlying the top (or upper) portion of the navigational map 300. The illustrated briefing panel 330 is realized as a menu bar that includes a plurality of selectable (or interactive) drop-down menu segments 332, 334, 336, with each segment 332, 334, 336 being associated with a particular type or category of procedure information. In the illustrated embodiment, the first drop-down menu segment 332 is associated with the identification or name of the selected aircraft procedure for the identified airport, the second drop-down menu segment 334 is associated with the selected radio frequency for the selected aircraft procedure, and the third drop-down menu segment 336 is associated with the selected minima criteria (or minimums) for the selected aircraft procedure (e.g., the minimum altitude, the minimum runway visual range (RVR)), as described in greater detail below.

Referring again to FIG. 2, and with continued reference to FIG. 1 and FIG. 3, after the user has selected the desired approach procedure, the user may select another graphical user interface element to indicate a desire to define parameters for the selected the aircraft procedure. For example, after the user has selected the desired approach procedure using radio buttons 314, 316, 318, the user may select button 320 to indicate a desire to define parameters for the runway 16R ILS approach that will be subsequently briefed and/or utilized when executing the ILS approach to runway 16R. After receiving indication of a desire to begin defining parameters for the selected aircraft procedure, the briefing sequence definition process 200 continues by identifying a selected category of procedure information for the selected aircraft procedure and graphically indicating the selected category (tasks 204, 206). When the selected category is capable of being parameterized, the briefing sequence definition process 200 displays potential values or criteria for the selected category of procedure information and identifies the selected value or criterion for the selected category (tasks 208, 210, 212). In an exemplary embodiment, the tasks 204, 206, 208, 210 and 212 are repeated until receiving indication that the user is done defining parameters for the selected aircraft procedure (task 214). In this regard, after selecting button 320, the user may manipulate the user input device 104 to emulate the desired briefing of the selected aircraft procedure that is to be performed during subsequent operation of the aircraft 120. For example, the sequence of selections made by the user may be prescribed by or otherwise in accordance with standard operating procedures (SOPs), crew resource management (CRM) protocols, or other procedures and/or protocols governing the user's subsequent operation of the aircraft 120. As described in greater detail below, the briefing sequence definition process 200 monitors, tracks, or otherwise maintains the sequence of selections made by the user as a briefing sequence for the selected aircraft procedure, and stores information indicative of the briefing sequence for use when subsequently briefing the selected aircraft procedure (task 216), as described in greater detail below in the context of FIG. 9.

For example, referring now to FIGS. 4-8, after selecting button 320, the user may begin emulating the desired briefing of the runway 16R ILS approach by manipulating the user input device 104 (e.g., using a cursor or pointer) to select the identifier menu segment 332 corresponding to the name or identifier of the selected aircraft procedure. In response to identifying selection of the menu segment 332, the processing system 106 may graphically indicate the selection by displaying or otherwise rendering the menu segment 332 using a visually distinguishable characteristic relative to the other selectable elements 334, 336, 340, 342, such as, for example, a visually distinguishable color, hue, tint, brightness, graphically depicted texture or pattern, contrast, transparency, opacity, animation (e.g., strobing, flickering or flashing), and/or other graphical effect. Additionally, in some embodiments, in response to identifying selection of a menu segment, the processing system 106 may provide auditory feedback indicative of the selected value or criterion for the selected category of information, in this case, the name of the selected aircraft procedure. In an exemplary embodiment, the auditory feedback is provided using aviation terminology. For example, in response to selection of the identifier menu segment 332, the processing system 106 may provide audio signals to the audio output device 105 that result in auditory feedback to the user consisting of "approach I-L-S runway one six right K-R-N-O Reno Tahoe International" concurrently to displaying the segment 332 using a visually distinguishable characteristic.

Figure 5:
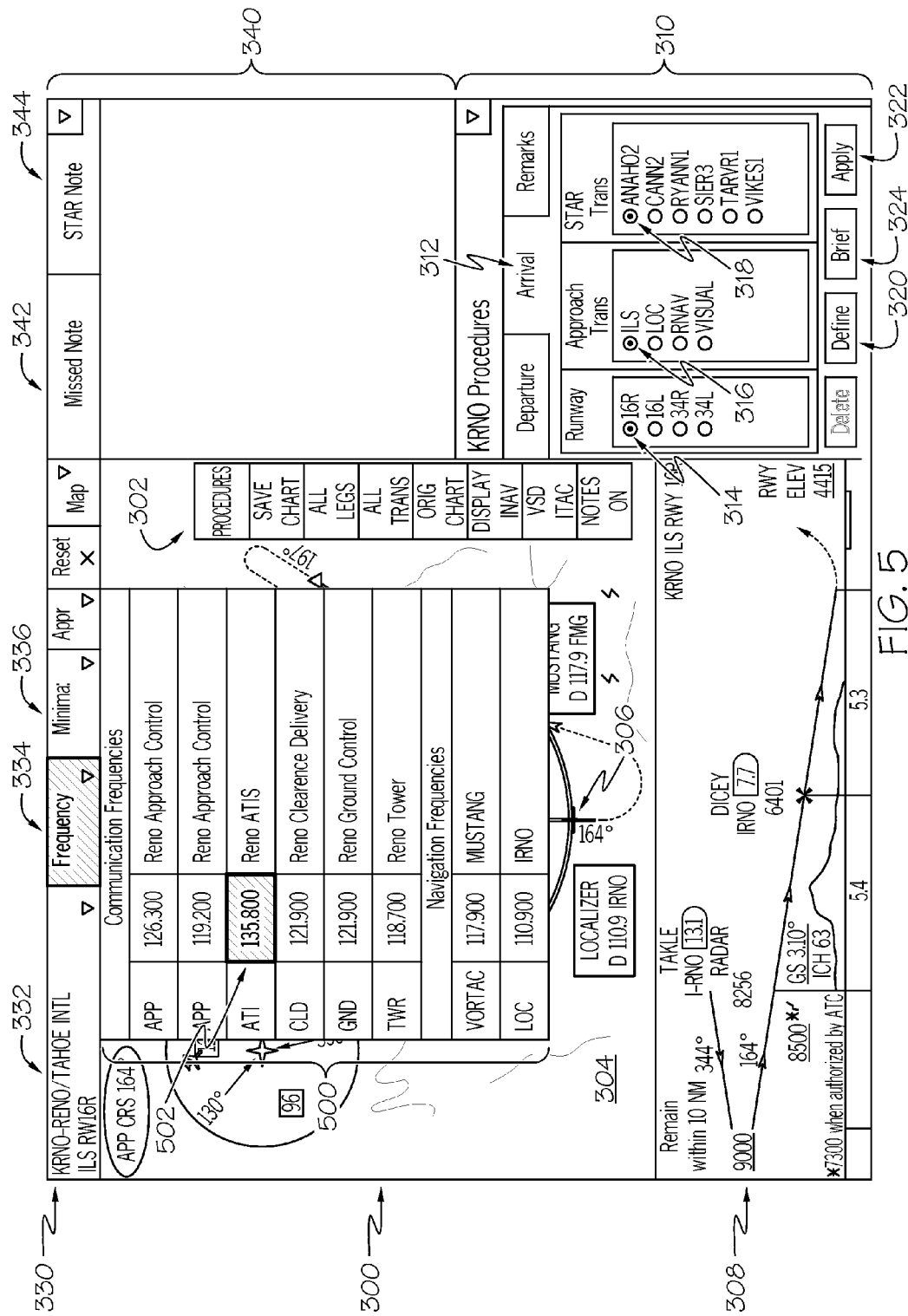

Turning now to FIG. 5, after selecting segment 332, the user may continue emulating the briefing of the runway 16R ILS approach by selecting the radio frequency menu segment 334. In response to identifying selection of the radio frequency menu segment 334, the processing system 106 may display or otherwise render the menu segment 334 using a visually distinguishable characteristic relative to the other selectable elements 332, 336, 340, 342. In response to determining that the radio frequency for the selected aircraft procedure is capable of being parameterized, the processing system 106 displays or otherwise renders a drop-down (or pull-down) menu 500 adjacent to the menu segment 334 and overlying the navigational map 300 that includes a list of the possible radio frequencies for the runway 16R ILS approach. The user may then manipulate the user input device 104 to select, from the drop-down menu 500, the desired radio frequency to be used and/or briefed during subsequent operation of the aircraft 120. For example, as illustrated, the user may select the entry 502 of the drop-down menu 500 corresponding to the automatic terminal information service (ATIS) radio frequency at the selected airport. In response to selection of the ATIS entry 502, the processing system 106 may provide audio signals to the audio output device 105 that result in auditory feedback to the user consisting of "Reno A-T-I-S one three five point eight set to Com 1" concurrently to displaying the ATIS entry 502 using a visually distinguishable characteristic.

Figure 6:
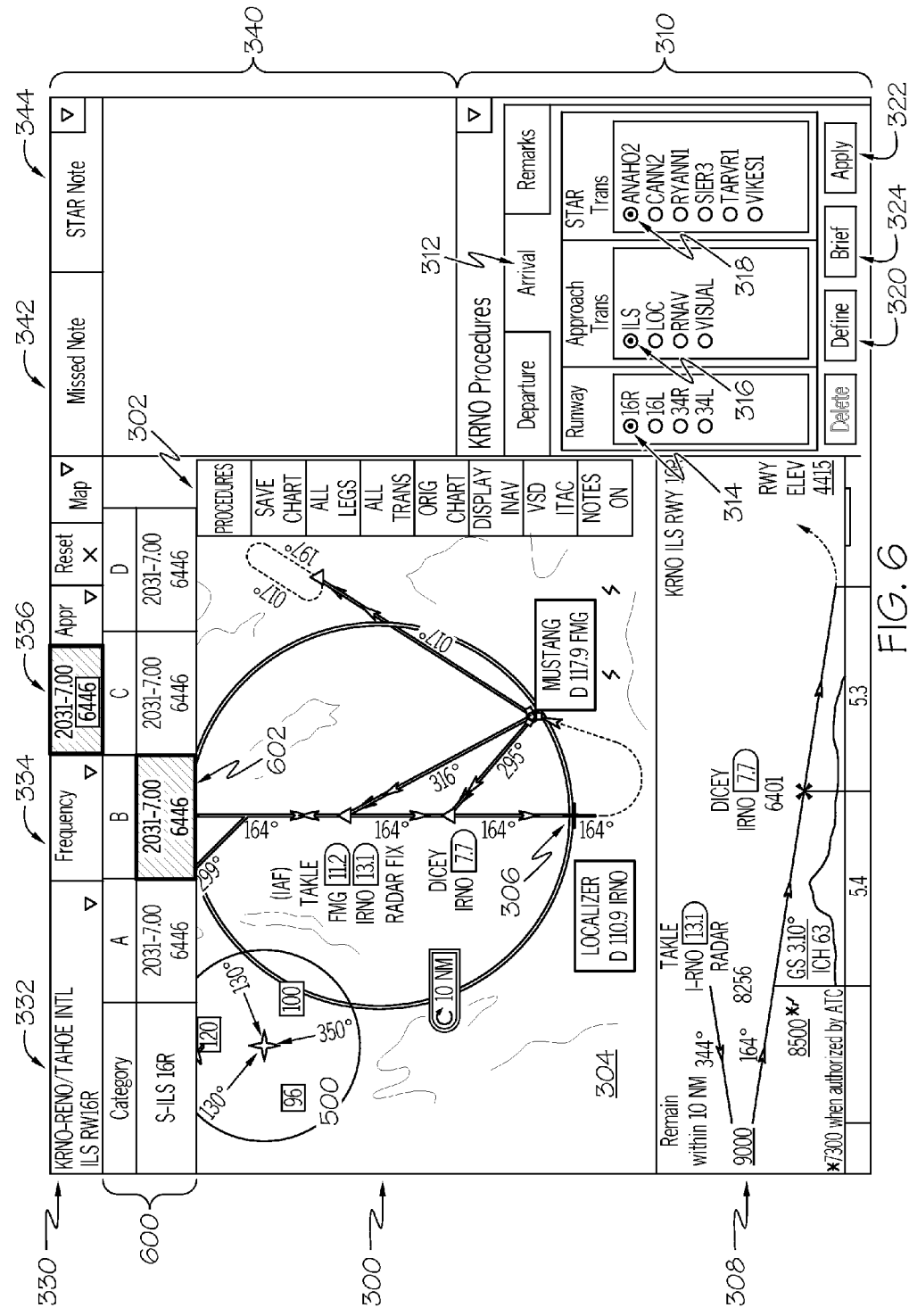

Turning now to FIG. 6, after selecting the desired radio frequency for subsequent briefing and/or utilization during execution of the runway 16R ILS approach, the user may continue emulating the briefing of the runway 16R ILS approach by selecting the minima menu segment 336. As described above, in response to selection of the minima menu segment 336, the processing system 106 displays the minima menu segment 336 using a visually distinguishable characteristic and displays a drop-down menu 600 overlying the navigational map 300 that includes a list of the possible minima for the runway 16R ILS approach. The user may then manipulate the user input device 104 to select, from the drop-down menu 600, the desired minima to be used and/or briefed during subsequent operation of the aircraft 120 based on the aircraft category for aircraft 120. In response to selection of the category B entry 602, the processing system 106 may provide audio signals to the audio output device 105 that result in auditory feedback to the user consisting of "minimums I-L-S one six right are seven miles visibility two thousand thirty one feet barometric" concurrently to displaying the category B entry 602 using a visually distinguishable characteristic. As illustrated, the processing system 106 may also update the minima menu segment 336 to reflect the selected minima.

Figure 7:
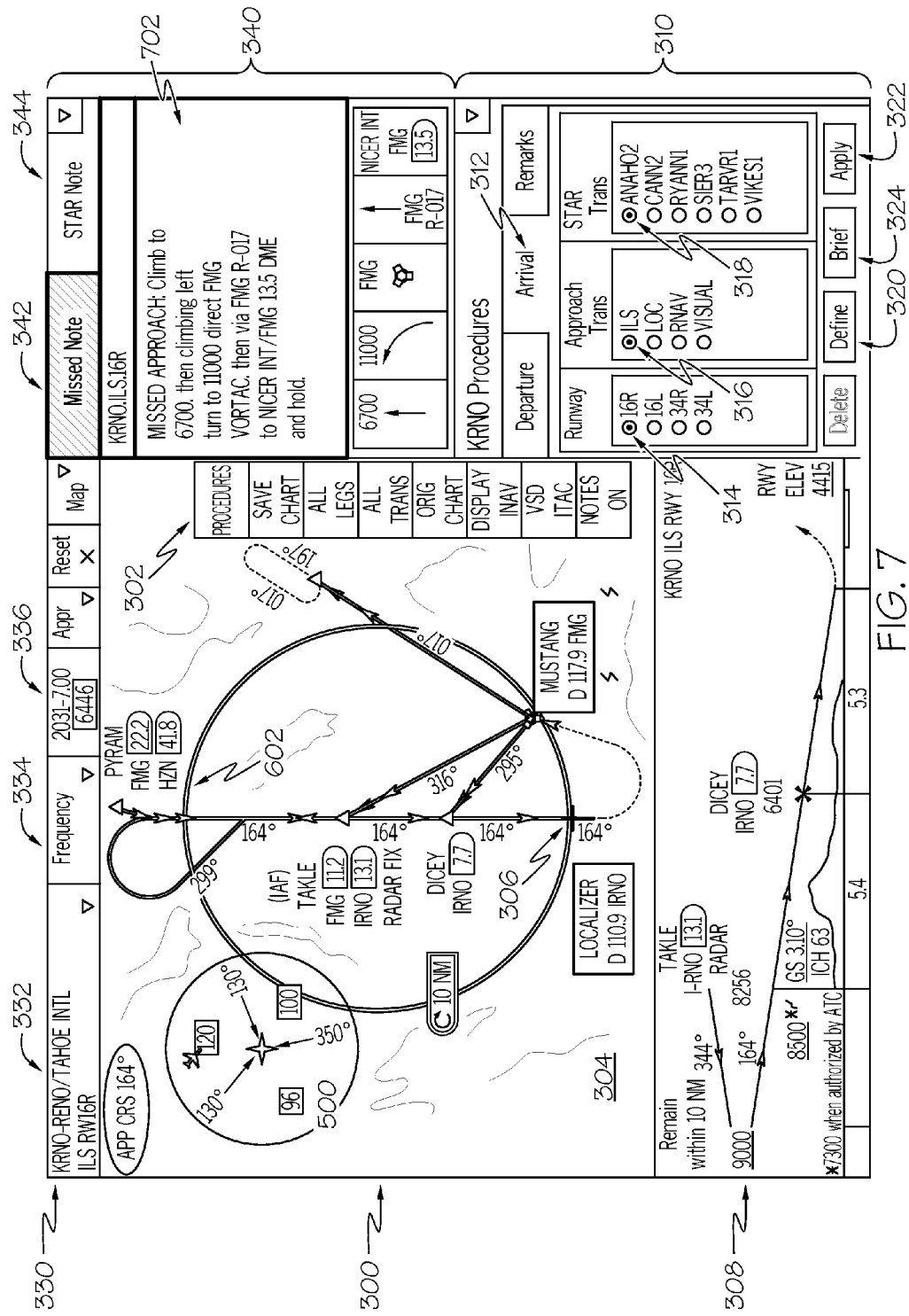

Turning now to FIG. 7, after selecting the desired minima for subsequent briefing and/or utilization during execution of the runway 16R ILS approach, the user may continue emulating the briefing of the runway 16R ILS approach by selecting the tab 342 corresponding to the notes and/or auxiliary instructions associated with the missed approach procedure for the runway 16R ILS approach. In response to selection of the missed approach notes tab 342, the processing system 106 graphically indicates selection of the missed approach notes tab 342 by displaying the tab 342 using a visually distinguishable characteristic and displaying the notes and/or auxiliary instructions 702 associated with the missed approach procedure for the runway 16R ILS approach below the tab 342 in the note region 340. As described above, the processing system 106 may also provide audio signals to the audio output device 105 that result in auditory feedback to the user consisting of the missed approach notes 702 (e.g., "missed approach climb to six thousand seven hundred, then climbing left turn to eleven thousand direct F-M-G VORTAC . . . ") concurrently to displaying the missed approach notes 702 in the note region 340.

Figure 8:
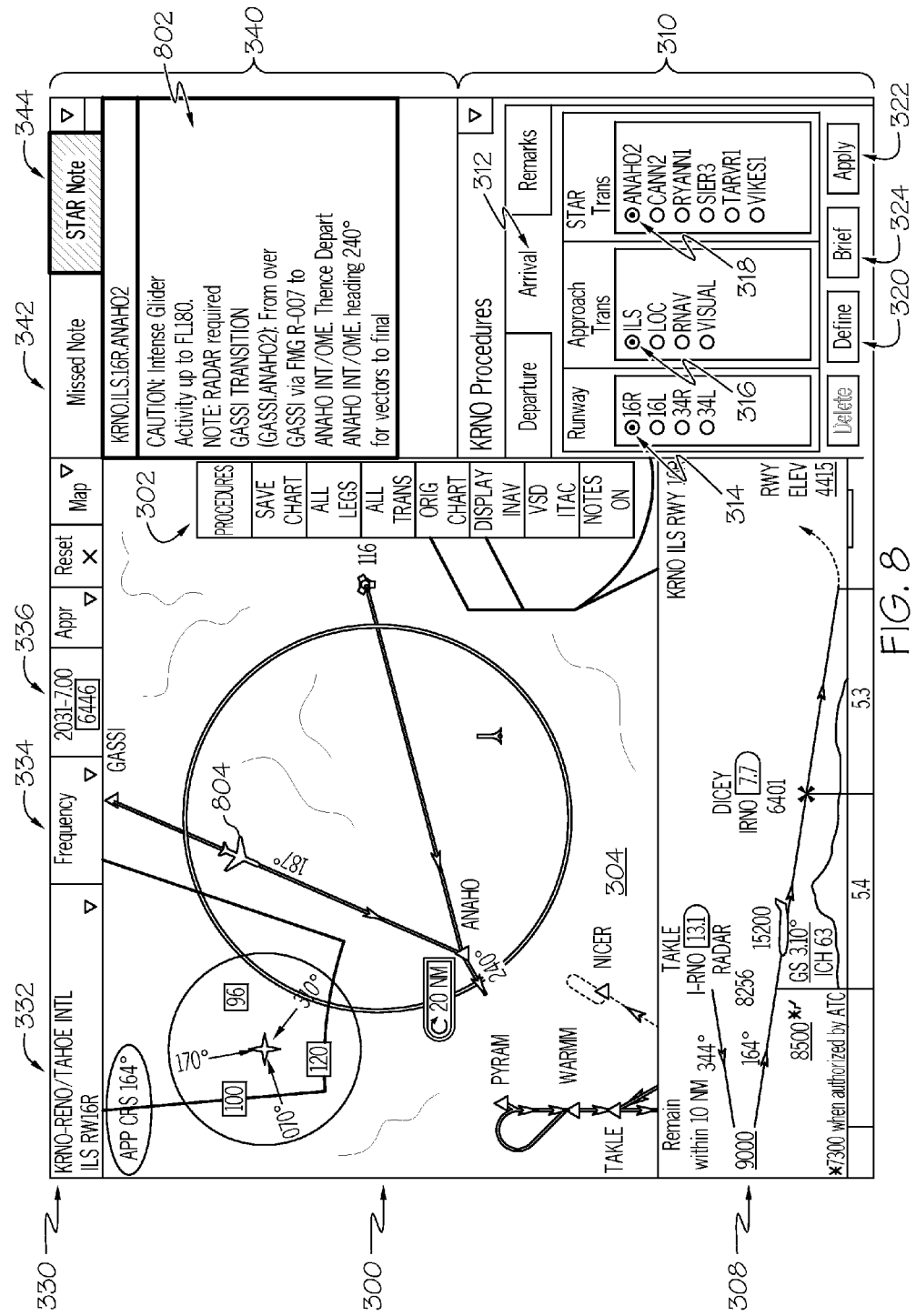

Turning now to FIG. 8, after selecting the missed approach notes, the user may continue emulating the briefing of the runway 16R ILS approach by selecting the tab 344 corresponding to the notes and/or auxiliary instructions associated with the transition from the selected arrival route to the runway 16R ILS approach. As illustrated, in response to selection of the arrival route notes tab 344, the processing system 106 displays the tab 344 using a visually distinguishable characteristic and displays the notes and/or auxiliary instructions 802 associated with the transition from the selected arrival route (ANAHO2) to the runway 16R ILS approach below the tab 344 in the note region 340. As described above, the processing system 106 may also provide audio signals to the audio output device 105 that result in auditory feedback to the user consisting of the arrival route notes 802 concurrently to displaying the arrival route notes in the note region 340. Additionally, in an exemplary embodiment, the processing system 106 automatically updates the navigational map 300 to depict the transition from the selected arrival route to the selected aircraft procedure, in this example, the transition from the ANAHO2 STAR to the runway 16R ILS approach. In this regard, the processing system 106 displays the graphic elements and/or textual information associated with the selected arrival route concurrently to displaying graphic elements and/or textual information associated with the selected approach procedure, and the processing system 106 and/or display system 108 automatically updates the background 304 to reflect the real-world terrain with respect to the graphic elements for the displayed aircraft procedures. After selecting the arrival route notes tab 344, the user may select a graphical user interface element, such as button 322, to indicate that the user is done defining the briefing sequence for the selected aircraft procedure. In response to receiving indication that the briefing sequence is completed, the processing system 106 stores or otherwise maintains the sequence of selected categories and selected criteria or values for the selected categories of aircraft procedure in association with the selected aircraft procedure for subsequent briefing of the selected aircraft procedure. For example, the processing system 106 may update the record in the data storage element 118 for the selected aircraft procedure to include information indicative of the briefing sequence defined or otherwise created by the user.

Figure 9:
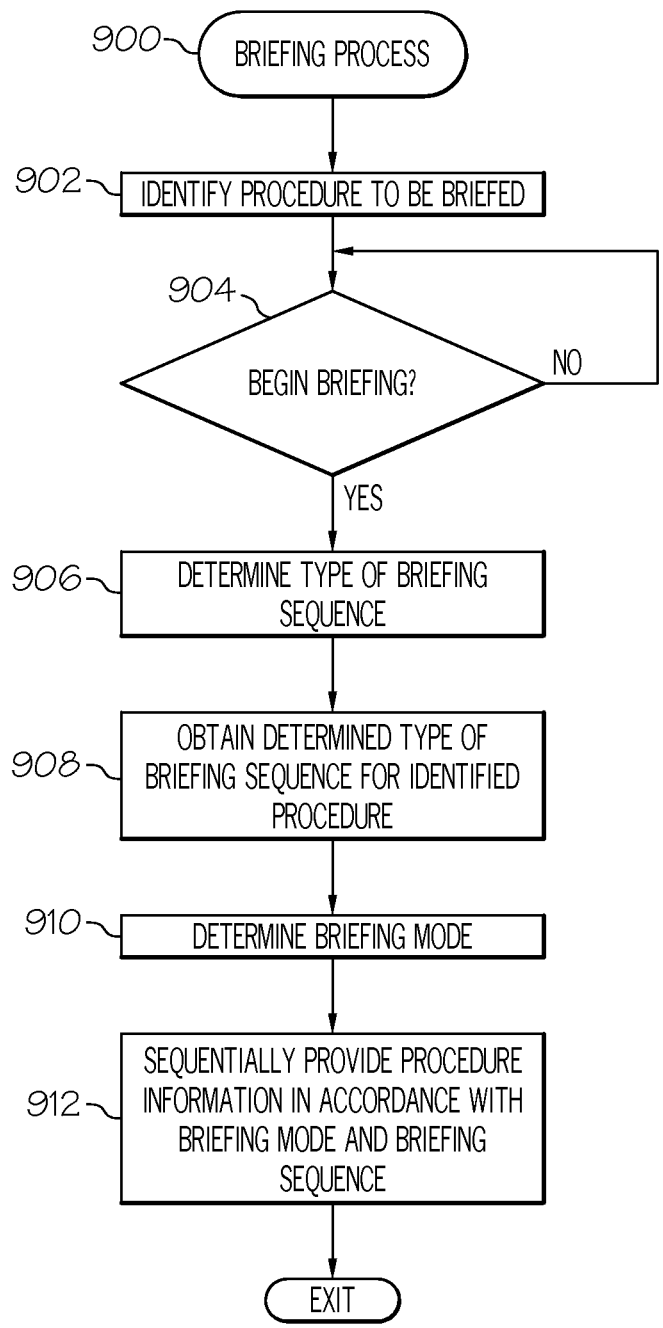
FIG. 9 is a flow diagram of an exemplary briefing process suitable for use with the system of FIG. 1 in accordance with one or more embodiments.

Referring now to FIG. 9, in an exemplary embodiment, the system 100 may be configured to perform a briefing process 900 and additional tasks, functions, and operations described below. The various tasks may be performed by hardware, firmware, software, or any combination thereof. For illustrative purposes, the following description may refer to elements mentioned above in connection with FIG. 1. In practice, the tasks, functions, and operations may be performed by different elements of the described system, such as the display device 102, the user input device 104, the audio output device 105, the processing system 106, the display system 108, the communications system 110, the navigation system 112, the FMS 114, the avionics system(s) 116, and/or the data storage element 118. It should be appreciated that any number of additional or alternative tasks may be included, and may be incorporated into a more comprehensive procedure or process having additional functionality not described in detail herein.

In an exemplary embodiment, the briefing process 900 is performed to brief a user (e.g., a pilot, a co-pilot, or another aircraft operator) regarding an aircraft procedure to be executed by the aircraft in an automated manner, that is, without requiring manual and/or visual interaction by the user. As described in greater detail below, a predefined briefing sequence is reproduced auditorily and/or visually in an automated manner to provide relevant procedure information for operating the aircraft during execution of the selected aircraft procedure. As a result, the user is capable of being briefed on the selected aircraft procedure without distracting the aircraft operator's eyes and/or hands from other tasks that the aircraft operator is engaged in. Additionally, the criteria for the various categories of procedure information associated with the selected aircraft procedure is provided sequentially in the ordering specified by the predefined briefing sequence to ensure that the procedure information is received in the desired manner.

Referring to FIG. 9, in an exemplary embodiment, the briefing process 900 begins by determining or otherwise identifying the aircraft procedure to be briefed (task 902). In an exemplary embodiment, the briefing process 900 automatically identifies the aircraft procedure to be briefed based on the flight plan maintained by the FMS 114. For example, the briefing process 900 may identify the approach procedure at the destination airport for landing the aircraft 120 that is specified by the flight plan as the aircraft procedure to be briefed. In other embodiments, the user may select or otherwise provide the aircraft procedure to be briefed. For example, the user may manipulate the user input device 104 to specify a particular airport and indicate the aircraft procedure at that airport to be briefed, for example, by selecting graphical user interface elements (e.g., elements 302, 312, 314, 316, 318) to identify the desired approach procedure to be briefed.

After identifying the aircraft procedure to be briefed, the briefing process 900 continues by determining or otherwise identifying when to begin briefing the identified aircraft procedure (task 904). In an exemplary embodiment, the briefing process 900 determines when to begin briefing the identified aircraft procedure based on the most recently obtained status information for the aircraft 120. In this regard, during operation of the aircraft 120, the processing system 106 may obtain (e.g., from FMS 114, navigation system 112 and/or other avionic systems 116) one or more of the following: the current flight phase for the aircraft 120, the current location of the aircraft 120 (or a particular distance from a navigational reference point or a desired track), the current altitude (or above ground level) of the aircraft 120, and/or the current heading (or bearing) of the aircraft 120. After obtaining current status information for the aircraft 120, the processing system 106 automatically determines when to begin briefing the identified aircraft procedure based on the obtained status information. For example, the processing system 106 may obtain the current flight phase for the aircraft 120 from the FMS 114 and identify current flight phase as being the arrival phase, and in response to identifying that the aircraft 120 is in the arrival phase, the processing system 106 may determine to begin briefing the identified approach procedure for the destination airport. In other embodiments, the processing system 106 may obtain the current location of the aircraft 120 and determine to begin briefing the identified approach procedure for the destination airport based on the distance between the aircraft 120 and the destination airport. In yet other embodiments, the processing system 106 may determine that the aircraft 120 to begin briefing the identified approach procedure for the destination airport based on the altitude of the aircraft 120 (e.g., when the aircraft 120 is below a certain threshold altitude), the location of the aircraft 120 within the flight plan (e.g., after traversing the top of descent point), or some other status information for the aircraft 120. It should be noted that in other embodiments, the briefing process 900 may determine to begin briefing the identified aircraft procedure in response to receiving user input indicative of a desire to brief a desired aircraft procedure (e.g., in response to receiving selection of graphical user interface element 324).

In an exemplary embodiment, the briefing process 900 continues by determining the type of briefing sequence to be used when briefing the identified aircraft procedure (task 906). In this regard, depending on the situation, it may be desirable to brief the aircraft procedure with more or less detail during operation of the aircraft 120. For example, standard operating procedures (SOPs) may require that a detailed briefing sequence be performed prior to beginning the approach procedure (e.g., after the aircraft traverses top of descent point and before the aircraft reaches the initial approach fix) and a less detailed briefing sequence be performed after beginning the approach (e.g., after the aircraft traverses the initial approach fix and before the aircraft reaches the final approach fix). In this regard, in some embodiments, the briefing process 900 and/or processing system 106 may determine the type of briefing sequence to be used based on the current status information for the aircraft 120 in a similar manner as set forth above. For example, the briefing process 900 may determine that a detailed briefing sequence should be used for briefing the approach procedure when the location of the aircraft 120 is between the top of descent point and the initial approach fix, and determine that a short briefing sequence should be used for briefing the approach procedure after the aircraft 120 has traversed the initial approach fix.

In an exemplary embodiment, the briefing process 900 continues by obtaining the determined type of briefing sequence for the identified aircraft procedure (task 908). In this regard, the processing system 106 obtains, from the data storage element 118, the stored briefing sequence for the identified aircraft procedure that matches or otherwise corresponds to the type of briefing sequence to be used. For example, after completing the briefing sequence definition process 200 described above, the processing system 106 may prompt the user to designate the briefing sequence type (e.g., detailed briefing sequence or short briefing sequence) to be associated with the stored briefing sequence. In some embodiments, if the data storage element 118 does not maintain the identified type of briefing sequence for the identified aircraft procedure, the processing system 106 may determine the appropriate briefing sequence using information maintained by the data storage element 118. For example, if the data storage element 118 maintains only a detailed briefing sequence for the identified aircraft procedure and the processing system 106 determined the desired briefing type is a short briefing sequence based on the status information of the aircraft 120, the processing system 106 may determine the short briefing sequence for the identified aircraft procedure by performing one or more algorithms to filter or otherwise parse the detailed briefing sequence to obtain a short briefing sequence for the identified aircraft procedure that satisfies the requirements for the short briefing sequence set forth by SOPs, CRMs, or the like. In yet other embodiments, if the data storage element 118 does not maintain any briefing sequence for the identified aircraft procedure, the processing system 106 may determine the appropriate briefing sequence by performing one or more algorithms on the procedure information maintained by the data storage element 118 for the identified aircraft procedure to obtain a briefing sequence that satisfies the requirements for that briefing sequence type set forth by SOPs, CRMs, or the like.

In an exemplary embodiment, the briefing process 900 continues by determining or otherwise identifying the desired briefing mode for briefing the identified aircraft procedure (task 910). For example, the briefing process 900 may be capable of briefing the identified aircraft procedure auditorily without a visual briefing, visually without an auditory briefing, or auditorily and visually. In some embodiments, the briefing process 900 may be configured for a default briefing mode. In other embodiments, the briefing process 900 may display, on the display device 102, graphical user interface elements (e.g., radio buttons or the like) adapted to allow a user to select the desired playback mode. In yet other embodiments, the briefing process 900 may determine the playback mode based on the current status information for the aircraft 120. For example, in the case of an approach procedure, the briefing process 900 may determine that the combined audio and visual briefing mode should be used for briefing the approach procedure when the location of the aircraft 120 is between the top of descent point and the initial approach fix, and determine that the audio only briefing mode should be used for briefing the approach procedure after the aircraft 120 has traversed the initial approach fix or otherwise begun executing the approach (e.g., to allow the pilot's visual focus to remain on operating the aircraft 120).

In an exemplary embodiment, the briefing process 900 continues by sequentially providing procedure information for the identified aircraft procedure in accordance with the determined briefing mode and the obtained briefing sequence (task 912). In this regard, the briefing process 900 and/or processing system 106 reproduces or otherwise replicates the procedure information identified by the obtained briefing sequence auditorily and/or visually in the order specified by the obtained briefing sequence to apprise the pilot and/or co-pilot of the relevant procedure information for operating the aircraft 120 during execution of the identified aircraft procedure. As a result, the relevant procedure information is presented or otherwise provided to the pilot and/or co-pilot in an automated manner without manual intervention, thereby allowing the pilot and/or co-pilot to maintain situational awareness and visual and/or manual focus on other tasks concurrently.

For example, referring now to FIGS. 1-9, in an exemplary embodiment, after the pilot of the aircraft 120 initiates the briefing sequence definition process 200 to define the detailed briefing sequence for airport 306, the pilot may subsequently fly the aircraft 120 en route to airport 306. During operation of the aircraft 120, the display system 108 may display, on the display device 102, a navigational map associated with the location of the aircraft 120 that accurately reflects the real-world positioning of the aircraft 120 with respect to the underlying terrain and is periodically updated to reflect the current (or instantaneous) location of the aircraft 120. The processing system 106 may periodically and/or continuously obtain current status information for the aircraft 120 (e.g., from FMS 114, navigation system 112 and/or other avionic systems 116) and monitor the progress of the aircraft 120 en route to the destination airport 306. The processing system 106 may automatically determine to begin briefing the identified approach procedure for airport 306 (e.g., the ILS approach for runway 16R) in response to the aircraft 120 reaching a certain location within the flight plan (e.g., the top of decent point) or within a certain distance of airport 306. The processing system 106 may determine that a detailed briefing sequence should be presented, obtain, from the data storage element 118, the detailed briefing sequence previously defined by the pilot using the briefing sequence definition process 200, determine the briefing mode, and automatically begin sequentially providing procedure information for the ILS approach for runway 16R via one or more output devices 102, 105 onboard the aircraft 120 in accordance with the determined briefing mode and detailed briefing sequence.

For example, when the desired briefing mode is the audio only briefing mode, after determining the ILS approach for runway 16R should be briefed, the processing system 106 automatically provide audio signals to the audio output device 105 to produce auditory output corresponding to the sequence of selections made by the pilot during the briefing sequence definition process 200. For example, the processing system 106 may provide signals to the audio output device 105 to first provide identification of the selected approach procedure (e.g., "approach I-L-S runway one six right K-R-N-O Reno Tahoe International"), followed by the previously selected radio frequency to be used when executing the approach (e.g., "Reno A-T-I-S one three five point eight set to Com 1"), followed by the previously selected minima (e.g., "minimums I-L-S one six right are seven miles visibility two thousand thirty one feet barometric"), followed by the missed approach notes (e.g., "missed approach climb to six thousand seven hundred, then climbing left turn to eleven thousand direct F-M-G VORTAC . . .") and then the arrival route notes (e.g., "from over GASSI via F-M-G radial zero zero seven to ANAHO intersection . . ."). In this manner, the pilot of the aircraft 120 may be automatically briefed auditorily on the relevant procedure information for the ILS approach for runway 16R without any manual and/or visual interaction by the pilot. Thus, the pilot may continue using his or her hands and eyes to operate the aircraft 120 while concurrently being briefed on the approach procedure that the pilot will be executing.

Figure 4:
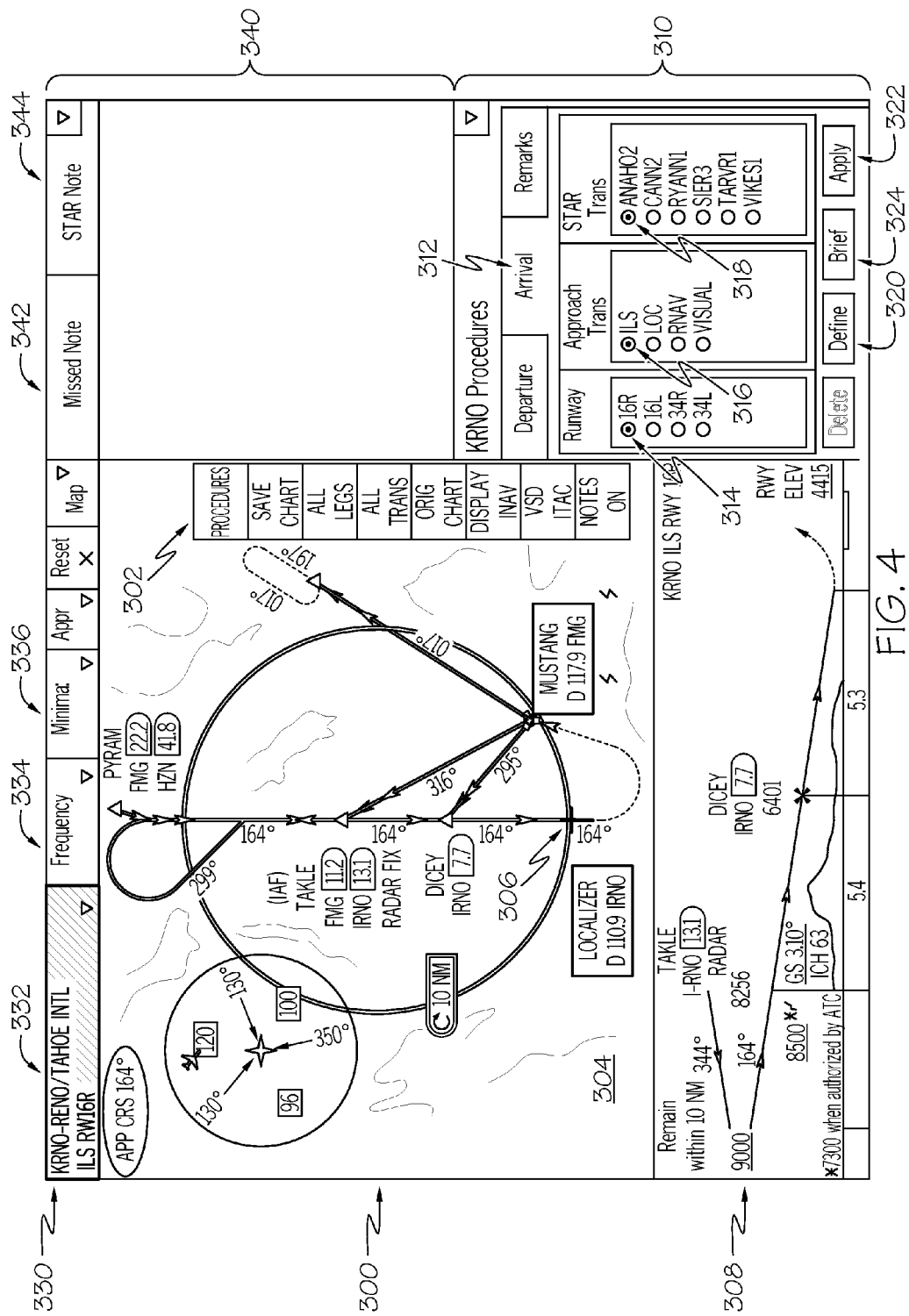

When the desired playback mode is the combined audio and visual briefing mode, the processing system 106 automatically updates the navigational map on the display device 102 concurrently to providing audio signals to the audio output device 105 to graphically indicate the sequence of selections made by the pilot during the briefing sequence definition process 200 in concert with the auditory output. Thus, the display device 102 visually reflects the sequence of selections made by the pilot during the briefing sequence definition process 200 while the corresponding auditory output is being provided. For example, in response to determining the ILS approach for runway 16R should be briefed visually and auditorily, the processing system 106 automatically provides signals to the display system 108 and/or display device 102 to update the navigational map to depict the graphic elements and textual information for the ILS approach for runway 16R, as described above. In other words, the processing system 106 automatically causes the display device 102 to be updated to the state depicted in FIG. 3, with the graphic elements and textual information for the ILS approach for runway 16R being displayed on the navigational map 300 along with the vertical profile 308, briefing panel 330, and note regions 340 being updated to reflect the ILS approach for runway 16R. While the processing system 106 is providing audio signals to the audio output device 105 to first provide auditory identification of the approach procedure (e.g., "approach I-L-S runway one six right K-R-N-O Reno Tahoe International"), the processing system 106 graphically indicates the identification menu segment 332 by displaying the identification menu segment 332 in a visually distinguishable characteristic. In other words, the identification menu segment 332 is highlighted on the display device 102 (e.g., as shown in FIG. 4) while the auditory identification of the ILS approach for runway 16R is concurrently provided via the audio output device 105. After the auditory identification of the ILS approach for runway 16R is completed, the processing system 106 automatically updates the navigational map 300 by reverting the display of the identification menu segment 332 to its original (or non-highlighted) state, displaying the drop-down menu 500, and graphically indicating the radio frequency menu segment 334 and ATIS entry 502 using a visually distinguishable characteristic (e.g., as shown in FIG. 5) while providing audio signals to the audio output device 105 to provide auditory identification of the selected radio frequency (e.g., "Reno A-T-I-S one three five point eight set to Com 1"), such that the radio frequency menu segment 334 is highlighted on the display device 102 while the auditory identification of the selected frequency is concurrently provided via the audio output device 105. In an exemplary embodiment, the selected categories of procedure information are graphically indicated on the display device 102 synchronously with their corresponding auditory output, that is, the state of the aircraft display on the display device 102 is updated in sync with a change in the auditory output from one category of procedure information to another category of procedure information. For example, when the auditory output changes from the identification of the ILS approach for runway 16R to the selected radio frequency for the approach, the display device 102 is automatically updated from the state depicted in FIG. 4 to the state depicted in FIG. 5 synchronously with the change in the auditory output.

In a similar manner, after the auditory identification of the selected radio frequency for the approach is provided, the processing system 106 automatically updates the navigational map 300 by reverting the display of the radio frequency menu segment 334 to its original (or non-highlighted) state, removing the drop-down menu 500, displaying the drop-down menu 600, and graphically indicating the minima menu segment 336 and category B entry 602 using a visually distinguishable characteristic (e.g., as shown in FIG. 6) while concurrently providing audio signals indicative of the selected minima to the audio output device 105. After the auditory identification of the selected minima is provided, the processing system 106 automatically updates the navigational map 300 by reverting the display of the minima menu segment 336 to its original (or non-highlighted) state, removing the drop-down menu 600, and displaying the missed approach notes tab 342 in a visually distinguishable characteristic along with the missed approach notes and/or instructions 702 in the note region 340 (e.g., as shown in FIG. 7) while providing audio signals indicative of the missed approach notes to the audio output device 105, and likewise, after providing the missed approach notes 702 auditorily, updating the navigational map 300 to display the graphic elements and/or textual information for the arrival route (e.g., as shown in FIG. 8) while providing audio signals indicative of the arrival notes 802 to the audio output device 105 concurrently. As illustrated in FIG. 8, when the visual briefing mode is performed during operation of the aircraft 120 prior to beginning the identified instrument approach procedure and the navigational map 300 is associated with the current (or instantaneous) location of the aircraft 120, a graphical representation 804 of the aircraft may be displayed overlying the navigational map 300 overlying the background 304 such that the aircraft graphic 804 is positioned over the terrain background 304 in a manner that accurately reflects the current (e.g., instantaneous or substantially real-time) real-world positioning of the aircraft 120 relative to the earth. In this regard, when the navigational map 300 is automatically updated to display the graphic elements and/or textual information for the arrival route, the pilot may also readily ascertain the location of the aircraft 120 with respect to the arrival route and/or instrument approach procedure.

It will be appreciated that when the desired briefing mode is the combined audio and visual playback mode, the pilot has the option of looking at the display device 102 for visual confirmation of the auditory information, thereby ensuring that the auditorily briefed procedure information is accurately received by the pilot. It should be noted that when the desired playback mode is the visual only briefing mode, the pilot must divert his or her eyes to view the display device 102 to brief the aircraft procedure, however, the briefing sequence is presented automatically, providing the relevant aircraft procedure information in the appropriate order, and thereby allowing the pilot's hands to remain free for performing other tasks concurrently. It should be noted that the visual only briefing mode may be advantageously employed when the auditory briefing may conflict with or otherwise obfuscate other auditory information or if the pilot does not desire additional noise in the cockpit, for example, when operating an aircraft model equipped with one or more other systems that provide auditory feedback (e.g., runway awareness and advisory systems (RAAS) and the like).

Figure 10:
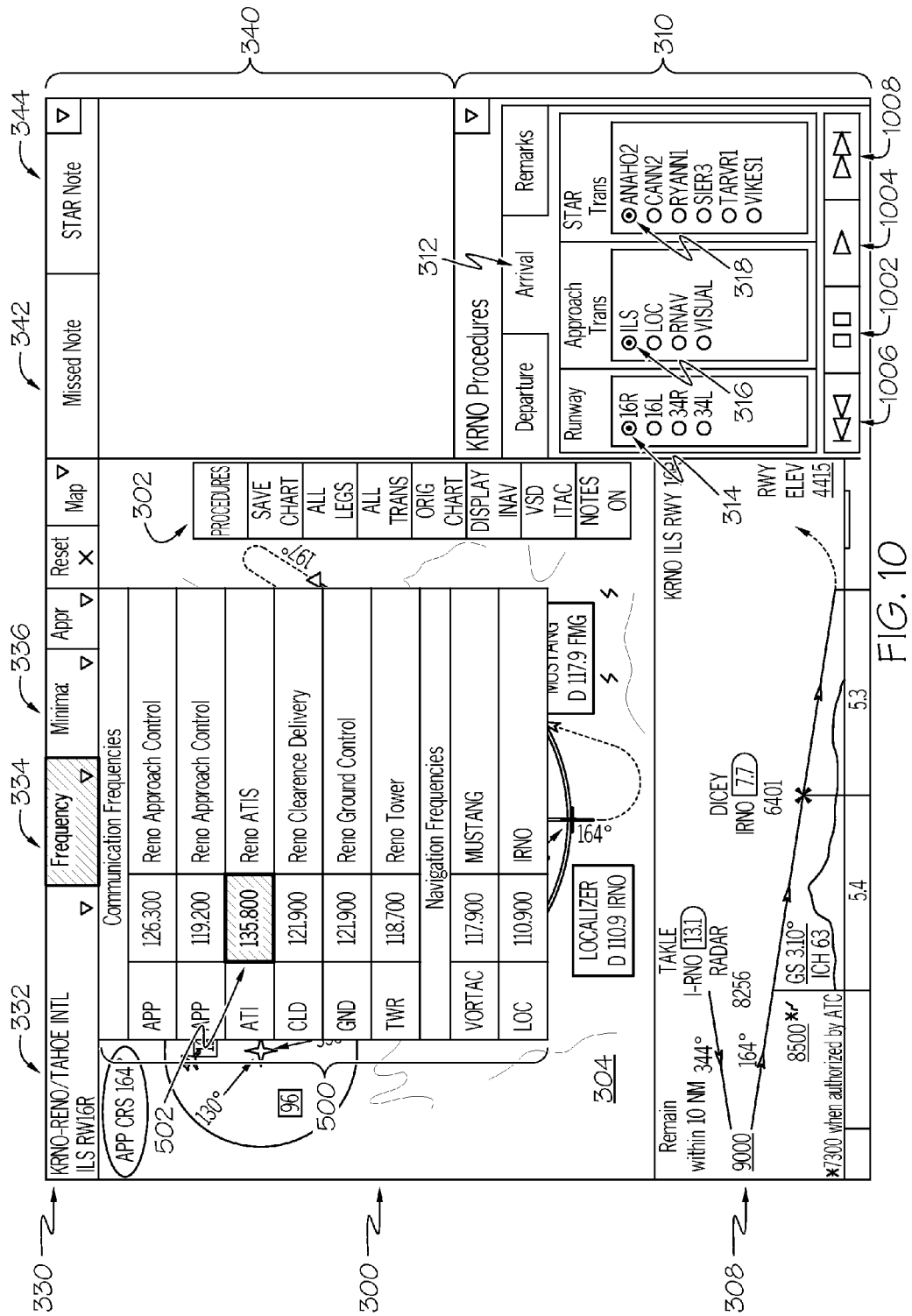
FIG. 10 is a schematic view of an exemplary aircraft display suitable for use with the briefing process of FIG. 9 in accordance with one or more embodiments.

Referring now to FIG. 10, in an exemplary embodiment, the briefing process 900 and/or processing system 106 displays graphical user interface elements 1002, 1004, 1006, 1008 adapted to allow the user to control the playback of the briefing sequence. For example, while the processing system 106 is providing audio signals indicative of the selected radio frequency criterion to the audio output device 105 and displaying the list 500 of the possible radio frequencies overlying the navigational map 300, the pilot may select button 1002 to pause the briefing process 900. In response to selection of the button 1002, the processing system 106 may pause the auditory output being provided by the audio output device 105 (e.g., by stopping sending audio signals to the audio output device 105) and maintain the list 500 displayed overlying the navigational map 300 to allow the pilot to review the possible radio frequencies for the identified aircraft procedure. Subsequently, the pilot may select button 1004 to resume the briefing process 900, wherein in response to selection of button 1004, the processing system 106 resumes providing audio signals to the audio output device 105 and continues with the briefing process 900 as described above.

As illustrated, the briefing process 900 and/or processing system 106 may also display a button 1006 adapted to allow the pilot to review preceding criteria of the briefing sequence, that is, procedure information that has already been provided. For example, if the auditory output identifying the approach procedure being briefed was unclear, the pilot may select button 1006. In response to selection of the button 1006, the processing system 106 automatically updates the display device 102 to reflect the preceding category of procedure information and concurrently provides the corresponding audio signals to the audio output device 105. For example, in response to selection of button 1006, the processing system 106 may automatically remove the list 500 from the display device 102 and graphically indicate the identification menu segment 332 using a visually distinguishable characteristic (as illustrated in FIG. 4), and concurrently provide audio signals to the audio output device 105 indicative of the identified approach procedure (e.g., "approach I-L-S runway one six right K-R-N-O Reno Tahoe International"). After the auditory output indicative of the identified approach procedure is provided, the briefing process 900 may continue as described above. Conversely, the pilot may select button 1008 to advance the briefing process 900. In response to selection of the button 1008, the processing system 106 automatically updates the display device 102 to reflect the succeeding category of procedure information and concurrently provides the corresponding audio signals to the audio output device 105. For example, in response to selection of button 1008, the processing system 106 automatically updates the navigational map 300 by reverting the display of the radio frequency menu segment 334 to its original (or non-highlighted) state, removing drop-down menu 500, displaying drop-down menu 600, and graphically indicating the minima menu segment 336 and category B entry 602 using a visually distinguishable characteristic (e.g., as shown in FIG. 6) while concurrently providing audio signals indicative of the selected minima to the audio output device 105.

To briefly summarize, the methods and systems described above allow a user, such as a pilot or co-pilot, to be briefed on an aircraft procedure in an automated manner without any manual interaction required on behalf of the user. As described above, the briefing of the aircraft procedure may be automatically initiated based on the status of the aircraft (e.g., flight phase, location, altitude, or the like). Once initiated, the various criteria for various categories of procedure information associated with the aircraft procedure are automatically provided, auditorily and/or visually, in a sequential manner that follows an ordering dictated by a predefined briefing sequence for the aircraft procedure. For example, if the ordering of the predefined briefing sequence prescribes that a criterion for a first category of procedure information (e.g., a selected radio frequency) precedes a criterion for a second category of procedure information (e.g., a selected minima), then the selected radio frequency is indicated or otherwise provided auditorily and/or visually first, with the selected minima being automatically indicated or otherwise provided auditorily and/or visually immediately after the selected radio frequency without any interaction by the user. Where the criteria are provided auditorily and visually, the criteria are provided in concert, such that the auditory output changes from one criterion to a subsequent criterion in sync with the display updating to indicate the subsequent criterion.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by processing system 106), facilitate display of aircraft procedure information overlying a navigational map on a display device (e.g., display device 102) in accordance with the briefing process 900 described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method to provide procedure information associated with an aircraft procedure for operating an aircraft during execution of the aircraft procedure using an output device onboard an aircraft, the method comprising:
   obtaining, by the processing system, a briefing sequence for the aircraft procedure from a data storage element, the briefing sequence prescribing an order in which respective categories of the procedure information should be briefed, one or more of the respective categories including various possible criteria, wherein the briefing sequence includes previously selected criteria for the respective categories of the procedure information and the order corresponds to a sequence of selections previously made by a user;
   automatically determining, by the processing system, when to begin briefing the aircraft procedure; and
   after determining the aircraft procedure should be briefed, automatically providing, by the processing system via the output device, the selected criteria for the respective categories of the procedure information sequentially in the order prescribed by the briefing sequence.

2. The method of claim 1, wherein automatically providing the selected criteria comprises sequentially providing, via an audio output device onboard the aircraft, the selected criteria in accordance with the sequence.

3. The method of claim 2, wherein sequentially providing the selected criteria in accordance with the sequence comprises:
   providing a first criterion associated with a first category of procedure information via the audio output device; and
   automatically providing a second criterion associated with a second category of procedure information via the audio output device after providing the first criterion.

4. The method of claim 2, wherein sequentially providing the selected criteria further comprises sequentially indicating, on a display device onboard the aircraft, the selected criteria in concert with sequentially providing the selected criteria via the audio output device.

5. The method of claim 4, wherein sequentially indicating the selected criteria in concert with sequentially providing the selected criteria via the audio output device comprises:
   providing, via the audio output device, a first criterion associated with a first category of procedure information;
   displaying the first criterion on the display device while auditorily providing the first criterion; and
   after providing the first criterion:
      automatically providing, via the audio output device, a second criterion associated with a second category of procedure information; and
      automatically displaying the second criterion on the display device while auditorily providing the second criterion.

6. The method of claim 1, wherein automatically providing the selected criteria comprises sequentially indicating, on a display device onboard the aircraft, the selected criteria in accordance with the sequence to visually reflect the sequence of selections made by the user.

7. The method of claim 1, wherein:
   the briefing sequence comprises a designated radio frequency of a plurality of possible radio frequencies for the aircraft procedure followed by a designated minima of a plurality of possible minima for the aircraft procedure; and
   automatically providing the selected criteria comprises:
      providing a first output indicative of the designated radio frequency via the output device; and
      after providing the first output, automatically providing a second output indicative of the designated minima via the output device.

8. The method of claim 1, further comprising obtaining status information for the aircraft prior to automatically providing the selected criteria, wherein:
   automatically determining when to begin briefing the aircraft procedure comprises the processing system automatically determining when to provide the selected criteria based on the status information; and
   automatically providing the selected criteria comprises automatically providing the selected criteria in response to determining the status information satisfies a briefing criterion.

9. A method for providing procedure information associated with an aircraft procedure, the aircraft procedure comprising an action that may be undertaken by an aircraft at or in the vicinity of an airport, the method comprising:
   obtaining, by a processing system, a briefing sequence for the aircraft procedure from a data storage element, wherein the briefing sequence prescribes an order in which respective categories of the procedure information should be briefed, one or more of the respective categories including various possible criteria or values, the briefing sequence including previously designated criteria or values for the respective categories of the procedure information and the order corresponding to a sequence of selections previously made by a user;
   obtaining, by the processing system, status information for the aircraft;
   automatically determining, by the processing system, when to begin briefing the aircraft procedure based on the status information; and
   sequentially providing, by the processing system, the designated criteria or values for the respective categories of the procedure information associated with the aircraft procedure via an audio output device onboard the aircraft automatically in response to determining the status information satisfies a briefing criterion, wherein the designated criteria or values are sequentially provided in the order prescribed by the briefing sequence.

10. The method of claim 9, further comprising graphically indicating the designated criteria or values on a display device onboard the aircraft concurrently to sequentially providing the designated criteria or values via the audio output device.

11. The method of claim 9, the designated criteria or values comprising a first criterion associated with a first category of procedure information and a second criterion associated with a second category of procedure information, the first category preceding the second category in an order defined by the briefing sequence, wherein sequentially providing the designated criteria or values comprises:
   auditorily providing the first criterion via the audio output device; and auditorily providing the second criterion via the audio output device automatically after auditorily providing the first criterion.

12. The method of claim 11, further comprising:
graphically indicating the first criterion on a display device onboard the aircraft concurrently to auditorily providing the first criterion via the audio output device; and
graphically indicating the second criterion on the display device concurrently to auditorily providing the second criterion via the audio output device.

13. The method of claim 12, wherein graphically indicating the second criterion comprises displaying the second criterion on the display device in sync with auditorily providing the second criterion.

14. The method of claim 12, wherein:
graphically indicating the first criterion comprises:
displaying a first list of possible values for the first category on the display device, the first list including a first entry corresponding to the first criterion; and
displaying the first entry using a visually distinguishable characteristic; and
graphically indicating the second criterion comprises:
displaying a second list of possible values for the second category on the display device after displaying the first list, the second list including a second entry for the second criterion; and
displaying the second entry using the visually distinguishable characteristic.

15. The method of claim 14, further comprising determining a briefing type for the briefing sequence based on the status information, wherein:
obtaining the briefing sequence comprises obtaining a sequence of criteria for a plurality of categories of procedure information associated with the aircraft procedure corresponding to the briefing type; and
sequentially providing the designated criteria or values comprises sequentially providing the criteria in the order defined by the sequence.

16. A system for an aircraft, the system comprising:
an audio output device onboard the aircraft;
a data storage element configured to maintain a briefing sequence for an aircraft procedure, the briefing sequence comprising an ordering of previously selected criteria for a plurality of categories of procedure information associated with the aircraft procedure for operating the aircraft during execution of the aircraft procedure, the ordering corresponding to a sequence of selections previously made by a user, one or more categories of the plurality of categories including various possible criteria; and
a processing system coupled to the audio output device and the data storage element, wherein the processing system is configured to obtain the briefing sequence from the data storage element, automatically determine when to begin briefing the aircraft procedure, and sequentially provide signals indicative of the selected criteria to the audio output device in accordance with the ordering automatically after determining the aircraft procedure should be briefed, the signals resulting in auditory output provided by the audio output device that is indicative of the selected criteria in the ordering prescribed by the briefing sequence.

17. The system of claim 16, further comprising a display device onboard the aircraft, wherein the processing system is coupled to the display device to graphically indicate the selected criteria concurrently to the auditory output.

18. The system of claim 16, wherein the processing system is configured obtain status information for the aircraft, automatically determine to begin briefing the aircraft procedure when the status information satisfies a briefing criterion, and sequentially provide the signals to the audio output device automatically in response to determining the status information satisfies the briefing criterion.

* * * * *